(12) United States Patent
Kecht et al.

(10) Patent No.: US 9,908,360 B2
(45) Date of Patent: Mar. 6, 2018

(54) SECURITY FEATURE AND METHOD FOR PRODUCING A SECURITY FEATURE

(75) Inventors: Johann Kecht, Munich (DE); Stephan Steinlein, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 702 days.

(21) Appl. No.: 13/377,276

(22) PCT Filed: May 31, 2010

(86) PCT No.: PCT/EP2010/057555
§ 371 (c)(1),
(2), (4) Date: Dec. 9, 2011

(87) PCT Pub. No.: WO2010/142553
PCT Pub. Date: Dec. 16, 2010

(65) Prior Publication Data
US 2012/0080878 A1    Apr. 5, 2012

(30) Foreign Application Priority Data

Jun. 10, 2009 (DE) .................. 10 2009 025 019

(51) Int. Cl.
*B42D 25/00* (2014.01)
*B42D 25/364* (2014.01)
(Continued)

(52) U.S. Cl.
CPC ............. *B42D 25/369* (2014.10); *B41M 3/14* (2013.01); *B42D 25/00* (2014.10); *B42D 25/29* (2014.10);
(Continued)

(58) Field of Classification Search
CPC ..... B42D 15/00; B42D 25/369; B42D 25/364
(Continued)

(56) References Cited

U.S. PATENT DOCUMENTS

2005/0181160 A1* 8/2005 Schneider ..................... 283/82
2009/0039644 A1   2/2009 Lawandy
(Continued)

FOREIGN PATENT DOCUMENTS

DE          10158403 A1     6/2003
DE          10217632 A1    11/2003
(Continued)

OTHER PUBLICATIONS

Ge, Jianping et al., Self-Assembly and Field-Responsive Optical Diffractions of Superparamagnetic Colloids, Langmuir, 2008, vol. 24, pp. 3671-3680, XP-002590764.
(Continued)

*Primary Examiner* — Kyle Grabowski
(74) *Attorney, Agent, or Firm* — Justin Cassell; Workman Nydegger

(57) ABSTRACT

The invention relates to a security feature for securing documents of value having a plurality of microcapsules, which respectively have a wall and in which is respectively contained a liquid medium in which are distributed several magnetic particles which are movable in the liquid medium and whose arrangement within the microcapsule is changeable by the action of a magnetic field, whereby the magnetic particles are configured to arrange themselves within the microcapsule such that they form a light-diffractive structure.

18 Claims, 2 Drawing Sheets

Figure 4:
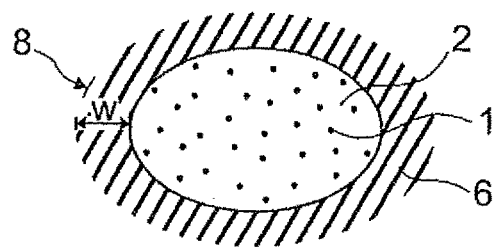

(51) Int. Cl.
  *B42D 25/369* (2014.01)
  *B41M 3/14* (2006.01)
  *C09D 11/02* (2014.01)
  *B42D 25/29* (2014.01)
(52) U.S. Cl.
  CPC ............ *B42D 25/364* (2014.10); *C09D 11/02* (2013.01); *B42D 2033/16* (2013.01)
(58) Field of Classification Search
  USPC ..................................... 283/72, 82; 359/280
  See application file for complete search history.

(56) References Cited

U.S. PATENT DOCUMENTS

2009/0059349 A1* 3/2009 Yamamoto et al. .......... 359/296
2013/0146788 A1* 6/2013 Yin et al. ..................... 359/280

FOREIGN PATENT DOCUMENTS

DE      10314631 A1   10/2004
EP      0702326        3/1996

OTHER PUBLICATIONS

Xu, Xiangling et al., Synthesis and Utilization of Monodisperse Superparamagnetic Colloidal Particles for Magnetically Controllable Photonic Crystals, Chem. Mater., 2002, vol. 14, pp. 1249-1256, XP-002590765.
International Search Report in PCT/EP2010/057555, dated Aug. 2, 2010.

* cited by examiner

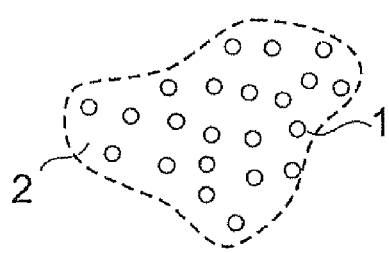
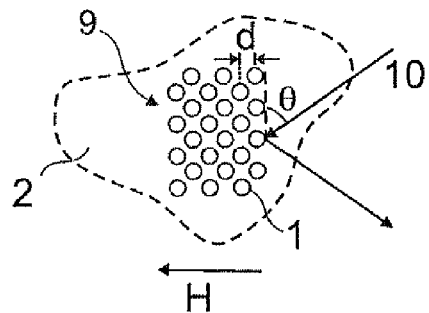
Fig.1a  Fig.1b
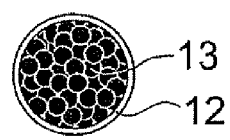
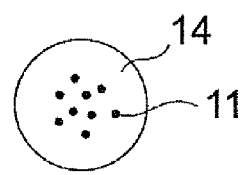
Fig.2a  Fig.2b
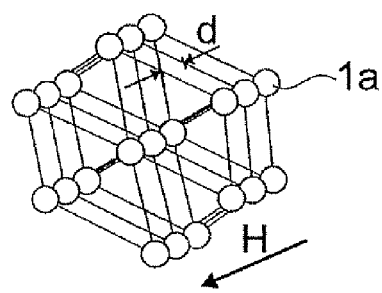
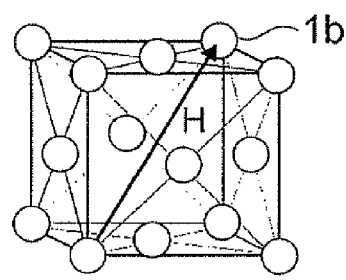
Fig.3a  Fig.3b

SECURITY FEATURE AND METHOD FOR PRODUCING A SECURITY FEATURE

The invention relates to a security feature and a method for manufacturing a security feature. Such security features are used to secure documents of value, in particular to secure the authenticity of the documents of value.

For securing documents of value, these are provided with security features and/or with security elements having security features, in order to make possible a check of the authenticity of the document of value. The security features and security elements serve to protect the documents of value from unauthorized reproduction. As security elements there are used for example security threads or foil elements, which are connected with a document of value. The security features can be connected with the substrate of the security element or with the substrate of the document of value itself.

From the prior art there are known security elements, whose optical appearance is changeable in a targeted fashion in dependence on external stimuli. Documents of value are provided for example with microcapsules which contain magnetic particles which are manipulable by an applied magnetic field. Through the applied magnetic field, the location or orientation of the magnetic particles in the microcapsule can be influenced such that the microcapsules can be toggled between a state transmissive to incident light and one non-transmissive to incident light. Through the external magnetic field there can thus be achieved with this security feature only a change in the transparency of the security feature.

It is therefore an object of the present invention to state a security feature influenceable by a magnetic field and having an optical appearance with greater variability.

Scientific studies have shown that certain magnetic particles within a liquid medium can be regularly arranged under certain conditions by applying a magnetic field (cf. Ge et al., Langmuir 2008, 24, 3671-3680; Xu et al., Chemical Materials 2002, 14, 1249-1256; both articles published by the American Chemical Society). Between the individual magnetic particles there act various forces, in particular magnetic and electrostatic forces, through which the particles in the liquid medium shift in such a way that they form a regular structure. The regular structure is present at least within a short-range order of the magnetic particles, but there can also be formed a long-range order. By applying a magnetic field, the forces between the magnetic particles and thus the arrangement of the magnetic particles in the liquid medium can be influenced. The magnetic particles can be arranged in the liquid medium under certain conditions such that they form a plurality of lattice planes which lead to a light diffraction. Through the regular structure of the magnetic particles there can be achieved a diffraction of incident visible light.

Magnetic particles which can form such a light-diffractive regular structure are employed according to the invention as a component of a security feature for securing documents of value. The security feature according to the invention comprises a plurality of microcapsules, which respectively have a wall and which respectively contain a liquid medium in which are distributed several magnetic particles. The magnetic particles are movable in the liquid medium and their arrangement within the microcapsule is changeable through the action of a magnetic field. The magnetic particles are furthermore configured to arrange themselves within the microcapsule such that they form a light-diffractive regular structure, in particular through the action of a magnetic field.

Compared to a direct incorporation of the liquid medium provided with magnetic particles into another liquid, e.g. as an emulsion into a liquid polymer precursor, the incorporation of the liquid medium provided with magnetic particles with the aid of microcapsules has various advantages: Due to the inclusion of the liquid medium provided with magnetic particles in the microcapsule, firstly, the size of the incorporated "liquid droplets" is controllable. Upon directly incorporating the liquid medium into the other liquid, however, the size of the "liquid droplets" is dependent on the incorporation conditions, such as e.g. on the stirring intensity. Secondly, through the protective and delimiting function of the microcapsule shell it is possible to disperse the liquid medium provided with magnetic particles and contained in the microcapsule without any problems in another liquid or viscous phase, without the two liquid media mixing thoroughly. In contrast to the above-mentioned liquid-liquid dispersions, it is thus not necessary to pay attention to a compatibility of the two liquid media.

By arranging the magnetic particles in the microcapsules a light-diffractive regular structure is formed, which is suitable for causing a light diffraction, in particular a Bragg diffraction of the light incident on the security feature. In particular, the light-diffractive regular structure of the magnetic particles can be formed, at least in certain areas, as photonic crystal. By the Bragg diffraction a part of the incident light is diffracted back on the lattice planes of the light-diffractive regular structure. The portion of the incident light, which is diffracted by the light-diffractive regular structure under Bragg diffraction, is referred to as reflected light for short in the following.

The light-diffractive effect of the light-diffractive regular structure is changeable through the action of a magnetic field. By a change of an applied magnetic field, e.g. of the magnetic field strength, of the magnetic field direction or of the magnetic field gradient, a change of the light-diffractive effect of the light-diffractive regular structure can be achieved in a targeted fashion. In dependence on an applied magnetic field, the spacing of the lattice planes of the magnetic particles can be changed and thus also the reflected wavelength and the color observable from outside. The wavelengths of the incident and the diffracted light here can be in the visible and/or in the infrared and/or in the ultraviolet spectral range. In dependence on the light's angle of incidence and on the magnetic field, light is reflected in the visible, in the infrared or in the ultraviolet spectral range through the Bragg diffraction at certain viewing angles. The optical appearance of the security feature has therefore a great variability.

The security feature can be employed for a visual monitoring by persons or for a machine monitoring by means of a detector.

For the visual check of the security feature there can be provided, that at specified viewing angles certain colors are observable in the visible. For the machine check of such a security feature, also wavelengths in the infrared or ultraviolet can be detected.

The light-diffractive regular structure either can be produced in a targeted fashion or changed in a targeted fashion by the applied magnetic field. For example, the security feature may be so constituted that the magnetic particles only under the action of a magnetic field form a light-diffractive regular structure. If, however, no magnetic field acts upon this security feature, the arrangement of the magnetic particles is random and they do not form a light-diffractive regular structure. Only through the action of a magnetic field, the magnetic particles in the liquid medium are arranged such that they form at least in certain areas a light-diffractive regular structure, in particular a photonic crystal structure. Upon turning off the magnetic field at the place of the security feature or upon removing the security feature from the magnetic field, there is effected a transition from the light-diffractive regular structure back into a random distribution of the magnetic particles. This can be effected suddenly or with a time lag. The characteristic time for the return into the random distribution depends, inter alia, on the viscosity of the liquid medium. The characteristic time both for the arrangement process of the regular structure out of the random distribution of the magnetic particles and the return to the random distribution, can be adjusted in a targeted fashion by the kind of liquid medium or certain additives to the liquid medium.

Alternatively, the security feature, however, can also be so constituted that a light-diffractive regular structure exists even without the action of a magnetic field. When no magnetic field acts upon the security feature, the magnetic particles form a first light-diffractive regular structure. Through the action of a magnetic field this first light-diffractive regular structure can be modified and e.g. converted into a second light-diffractive regular structure. Whether a light-diffractive regular structure exists even without the action of a magnetic field or can form only upon an applied magnetic field, depends on the properties of the magnetic particles and on the kind of liquid medium.

The invention also relates to a method for manufacturing a security feature, wherein a liquid medium, in which several magnetic particles are distributed, is encapsulated in a plurality of microcapsules. The magnetic particles are movable in the liquid medium and the arrangement of the magnetic particles within the microcapsules is changeable through the action of a magnetic field. The magnetic particles are configured to arrange themselves within the microcapsules such that they form a light-diffractive regular structure.

For manufacturing the microcapsules of the security feature according to the invention, the methods for microencapsulation of liquids known from the prior art are used, for example coacervation or interfacial polymerization. As a material for the shell of the microcapsule, which is formed upon the microencapsulation, there are suitable e.g. synthetic or natural polymers, polyurethane, polyurea, melamine resins, melamine/formaldehyde, proteins, gelatin, modified gelatin, polylactates, polyacrylates (e.g. PMMA), silicones or inorganic oxides (e.g. silicates, titanium oxides, hafnium oxides or iron oxides).

In order to manufacture from the microcapsules a stable security feature which can be used for securing documents of value, the microcapsules are surrounded with a wall. According to the invention, these microcapsules are stabilized through the wall, by which they are surrounded, such that they can be employed to secure documents of value. The stabilization of the microcapsules allows that the security feature containing the microcapsules is stable against the mechanical loads which usually occur upon the use of the documents of value.

Surrounding the microcapsules with the wall is preferably carried out before the security feature is connected with the document of value to be secured, in particular before applying or incorporating the security feature onto or into the document of value to be secured. The microcapsules produced in this way, surrounded with the stabilizing wall, are then connected with the document of value. This stabilization allows that the microcapsules surrounded with the stabilizing wall can be connected with the document of value also by those application or incorporation methods which involve a strong mechanical load on the microcapsules. For example, the microcapsules are stabilized through their wall such that they can be applied by a printing process onto the document of value. In an embodiment, the microcapsules are surrounded with the stabilizing wall already during the encapsulation process itself, so that the wall is formed by the original shell of the microcapsule. In a different embodiment, onto the original shell of the microcapsule there is applied a protection layer which forms, together with the shell, the stabilizing wall surrounding the microcapsule.

An increased stability of the microcapsules can be achieved through a variety of measures. In order to achieve this stability of the microcapsules, the microcapsules can be provided with a wall of a large wall thickness. The wall of the microcapsule preferably has a wall thickness of at least 10%, in particular of at least 20% of the largest diameter of the microcapsule. Preferably, the wall thickness at every point of the wall is at least 10%, in particular at least 20% of the largest diameter of the microcapsule. Preferably, the microcapsules have wall thicknesses of at least 2 µm, in particular at least 4 µm. Preferably, the wall thickness at every point of the wall is at least 2 µm, in particular at least 4 µm. In order to increase the stability of the microcapsules, there can be chosen, in addition or as an alternative to the large wall thickness, particularly small microcapsule diameters. Smaller microcapsules are for example less vulnerable to a bending or folding of the documents of value into which they are incorporated or onto which they are applied. Preferably, the microcapsules thus have a diameter of no more than 20 µm, in particular of no more than 10 µm. Preferably, the diameter of the microcapsule in each spatial direction is no more than 20 µm, in particular no more than 10 µm.

In an embodiment, the walls of the microcapsules respectively consist of the shell which is produced upon the manufacturing of the microcapsule and which in the following is referred to as the original shell. In this embodiment, the wall of the microcapsule, which ensures the increased stability of the microcapsule, is formed solely by this original shell.

In another embodiment, the walls of the microcapsules respectively consist of the original shell (produced upon the manufacturing of the microcapsule) and a protection layer by which this original shell is completely surrounded. The protection layer here is arranged directly on the original shell of the microcapsule.

In a first variant of this embodiment, every microcapsule has its original shell and an individual protection layer which is individually applied onto the shell of the microcapsule. The term "individually applied onto the microcapsule" means that the microcapsule is individually surrounded with protection layer material, the protection layer material of the various microcapsules not being connected with each other. The individual protection layer is therefore not provided by a protection layer material which surrounds many microcapsules. This individual protection layer forms an additional encasement of the respective microcapsule. Together with the original shell the individual protection layer forms the wall of the microcapsule. The protection layer here can consist of one or of several individual layers. The wall in this variant consists of at least two different layers which directly adjoin each other. Preferably, the individual protection layer has polymer or silica or a mixture of polymer and silica.

In a second variant of this embodiment, the protection layer is provided by a solid-state layer, in which several microcapsules are embedded. Together with the respective original shell, the solid-state layer forms, in particular the portion of the solid-state layer which directly surrounds the original shell, the wall of the respective microcapsule. The solid-state layer is formed for example as a polymer layer.

The invention further relates to a security element which has a security feature according to the invention. The security element is intended for the application onto a document of value or incorporation into a document of value. The security feature is e.g. a security strip, a security thread, a security band or a transfer element for the application onto a document of value. Further, the security element can be a printing ink which is applied onto the document of value. The security element may in particular be formed as a feature area printed directly onto the document of value. Moreover, the invention also relates to a security paper and a document of value, onto or into which a security feature according to the invention is applied or incorporated and/or which has such a security element. The documents of value to be secured are for example bank notes, checks, identification documents, passports, credit cards, check cards, tickets, vouchers, shares, deeds, tokens etc.

A security feature according to the invention has for example a solid-state layer with microcapsules embedded therein, whereby the solid-state layer is provided as a component of a document of value to be secured. The solid-state layer, in which the microcapsules are embedded, can be e.g. the substrate of a document of value to be secured, in particular a plastic substrate, e.g. polymer substrate, and/or a paper substrate. The solid-state layer, however, can also be formed by a plastic foil which is intended for the application onto a document of value to be secured or the incorporation into a document of value to be secured. For example, the solid-state layer can be a part of a transfer element, of a security thread, of a patch or of a hologram. Alternatively, the solid-state layer can also be formed by a planchette, a mottling fiber or a solid-state particle, which is applied onto a document of value to be secured or is incorporated into a document of value to be secured.

Alternatively, a security feature containing the microcapsules according to the invention is applied onto the surface of the document of value to be secured. For this purpose, the microcapsules are first incorporated into a liquid, which then is applied onto the document of value and cured. As a liquid with which the microcapsules are applied onto the document of value there are suitable in particular heat- or UV-curable lacquers, binders, polymerizable monomer solutions or drying dispersions, such as e.g. printing inks, or other curable liquids with suitable melting points. After the curing of the liquid in which the microcapsules are embedded, e.g. by UV radiation, drying, temperature change, the cured material forms an additional protection layer for the microcapsules.

Preferably, the microcapsules are incorporated into a printing ink or in a binder for a printing ink. The mixture of printing ink and microcapsules, as well as optional further substances, is then, during a printing process, applied onto a substrate. The substrate printed in this way can be the substrate of the document of value itself or a security element which is configured to be applied onto the document of value or incorporated into the document of value. As printing methods there are suitable e.g. screen printing, intaglio printing, halftone gravure or flexo printing. To the binder or to the printing ink there can also be admixed, besides the microcapsules, pigments or other optically active substances. Depending on the mechanical load, which the microcapsules are subjected to during the printing process, it may be necessary to use microcapsules with an individually applied stabilizing wall here (cf. microcapsules 8a and 8b in FIGS. 5a and 5b). Due to their individually applied wall these microcapsules have, even without embedding into a solid-state layer, an increased stability. For the application during a printing process, thus, the microcapsules with individually applied stabilizing wall are preferably used. The term "individually applied onto the microcapsule" means that the microcapsule is individually surrounded with the wall material, the wall material of the various microcapsules not being connected with each other.

For forming the light-diffractive regular structure, magnetic particles of different forms can be used. For example, the magnetic particles are formed as spheres, cylinders, discs, plates, needles, prisms or have an irregular form. The magnetic particles have e.g. polycrystalline magnetic material.

The magnetic particles are preferably formed as superparamagnetic particles. In contrast to ferro- or ferrimagnetic particles, these superparamagnetic particles have a vanishing remnant magnetization. If these superparamagnetic particles are exposed to a magnetic field, they are magnetized by the action of the magnetic field. Upon removal of the magnetic field, the magnetization of the superparamagnetic particles completely vanishes. For the application as a security feature, the vanishing remnant magnetization may be of advantage, since the magnetization in this case is fully reversible and this facilitates to influence the security feature from outside in a targeted fashion. With regard to the use as a security feature, the complete vanishing of the magnetization, however, is not necessarily required.

Alternatively, the magnetic particles used for the security feature can thus also be formed as ferro- or ferrimagnetic particles, the remnant magnetization of which is very low. In particular, the remnant magnetization of the ferro- or ferrimagnetic particles is no more than 20% of their saturation magnetization, preferably no more than 10%. In this case, the magnetization of the particles vanishes not completely when they are removed from the magnetic field, but it is so low that the magnetization remains influenceable in a targeted fashion by usual magnetic field strengths. For the magnetic influencing, the magnetization of ferro- or ferrimagnetic particles can be further increased by a correspondingly large applied magnetic field, so that here too a targeted change in the lattice plane spacing and in the optical properties of the security feature is possible.

If ferro- or ferrimagnetic particles are used as magnetic particles, preferably, measures are taken in order to prevent a possible agglutination of the ferro- or ferrimagnetic particles upon strong magnetic fields. Either the ferro- or ferrimagnetic particles are already chosen such that an agglutination of the particles is prevented. This agglutination can be prevented e.g. by setting a correspondingly strong electrostatic repulsion of the ferro- or ferrimagnetic particles or by a coating and/or functionalization of the ferro- or ferrimagnetic particles, in order to achieve by steric or electrostatic forces a correspondingly great repulsive force between the magnetic particles. The above-mentioned measures for preventing the agglutination can be advantageously used also for superparamagnetic particles.

Superparamagnetic particles are usually only superparamagnetic below a certain size. Upon a larger dimension of the individual particles, the paramagnetic properties vanish and the particles become e.g. ferromagnetic. However, the magnetic particles should be as large as possible, so that the magnetic forces are sufficient for forming the light-diffractive regular structure. The superparamagnetic particles distributed in the microcapsule according to the invention thus respectively contain preferably several superparamagnetic nanoparticles. For example, the superparamagnetic particles are respectively formed by an agglomerate of several superparamagnetic nanoparticles adjoining each other. The superparamagnetic nanoparticles, however, can also be distributed within the respective superparamagnetic particle without adjoining each other.

The superparamagnetic particles, in particular the superparamagnetic nanoparticles, contain e.g. one or more of the following materials: Iron oxide, in particular $Fe_2O_3$ or $Fe_3O_4$, magnetite, maghemite or also ferrites, in particular compounds of the type $MFe_2O_4$, whereby M is a divalent cation or a mixture of several divalent cations, e.g. $ZnFe_2O_4$, $CoFe_2O_4$. For example, every single superparamagnetic nanoparticle consists of a certain magnetic material. Alternatively, every single superparamagnetic nanoparticle has a mixture of two or more magnetic materials. For example, upon the synthesis of $Fe_3O_4$-nanoparticles, there usually results a considerable secondary phase of $Fe_2O_3$, so that there is naturally present a mixture of two superparamagnetic materials within the same nanoparticles. On the other hand, for manufacturing the nanoparticles, also various superparamagnetic materials with different properties can be combined in a targeted fashion. Thereby, properties of the resulting particles, e.g. their magnetizability, can be adjusted in a targeted fashion. In this way, e.g. the magnetic field strength ranges and the corresponding wavelength ranges of the diffracted light can be controlled. Further, within one superparamagnetic particle there can also be contained different kinds of superparamagnetic nanoparticles, which are formed from different magnetic materials.

Furthermore, the properties of the magnetic particles can also be adjusted in a targeted fashion by a combination of a magnetic substance with a non-magnetic substance. For example, the influence of a magnetic field on particles which consist of a mixture of iron oxide and an inert filler is lower than on particles which consist of pure iron oxide. By mixing magnetic materials with non-magnetic materials there can thus be reduced in a targeted fashion the magnetizability of the magnetic particles.

The magnetic particles contained within a microcapsule can be monodisperse. Alternatively, however, also magnetic particles of different kinds can be contained within the microcapsules in a targeted fashion. For example, it may be advantageous for the application as a security feature that within the microcapsules magnetic particles of different sizes are respectively used. Magnetic particles of different sizes form their light-diffractive regular structures upon different magnetic field strengths and prefer different lattice planes spacings. In comparison to the case of monodisperse magnetic particles, there can thus be broadened, by incorporating magnetic particles of different sizes into the microcapsules, the wavelength range which can be covered with a security feature. Alternatively, the security element can of course have also different kinds of microcapsules in which are contained different, e.g. differently sized, magnetic particles.

Whether the magnetic particles in the liquid medium can form a light-diffractive regular structure, in particular a photonic crystal structure, depends on the various forces which act upon the magnetic particles in the liquid medium. These may be electrostatic forces, magnetic forces and steric hindrance forces, which arise for example through solvation shells of the magnetic particles. Important parameters through which the arrangement of the magnetic particles can be influenced are therefore e.g. the surface charges of the particles, the kind of liquid medium, e.g. the polarity of the liquid medium, and the kind and quantity of magnetic material, which is contained in the magnetic particles. By a suitable choice of these parameters, the formation of a light-diffractive structure in the liquid medium can be promoted. The properties of the light-diffractive structure, e.g. the grid type of the structure and/or the lattice plane spacing can be varied by a variation of these parameters.

The steric repulsion can be adjusted by the functionalization of the particle surface with suitable groups. Depending on the space required by the functionalization groups, the steric repulsion of the magnetic particles can be increased or decreased. The magnetic forces between the magnetic particles are usually attractive and can be adjusted by the kind and quantity of magnetic material per magnetic particle. The electrostatic repulsion forces can be adjusted, e.g. by the functionalization of the particle surface and/or by additives in the liquid medium, which facilitate the formation of surface charges.

In order to form a light-diffractive regular structure of magnetic particles in a liquid medium, it is of advantage to adjust the liquid medium and the magnetic particles to each other. Depending on the kind of the magnetic particles, the light-diffractive regular structure can only form in certain liquid media, while in other liquid media e.g. there is no sufficient dispersion of the particles or the repulsive forces between the particles are not in the right relation to the attractive forces. According to the invention, for the application as a security feature there are used such magnetic particles and such liquid media which are compatible with each other. For example, in dependence on the kind of the magnetic particles, there are chosen such liquid media which are compatible to these magnetic particles.

In order to achieve said compatibility and/or in order to influence the forces between the magnetic particles, the magnetic particles themselves can be modified, e.g. by the functionalization of the particle surface. For this purpose, the magnetic particles are coated with a coating material and then functionalized with suitable chemical groups, in order to receive a functionalized particle surface. As a coating material of the magnetic particles there can be used e.g. silica or polymer. Further, as a coating material there can also be used the following materials: inorganic materials (such as e.g. silicon dioxide, titanium dioxide, aluminum oxide or other metal oxides, metal sulphides, metal sulphate or also metal silicates), organic materials (e.g. polymers, starch, sugar) or a combination of inorganic and organic materials (e.g. organosilicates, silicones, functionalized sol-gel systems). The functionalization can be effected e.g. in that charge-carrying or charge-generating groups are placed on the coated particle surface. The coated surface of the magnetic particles can be functionalized with the aid of organic molecules, e.g. with the aid of an organosilane. For the functionalization for example the following groups can be used: phenyls, amines, sulfonic acid, carboxylic acid, quaternary ammonium groups, aliphatics, aromatics, alkanes, esters, thiols, aldehydes, alcohols, ketones, amides, polyethers, ethers, sugar. In an embodiment, the magnetic particles are formed of an agglomerate of several superparamagnetic nanoparticles. The coating of the agglomerate is effected e.g. with silica and the functionalization with one or several organosilanes, e.g. with trialkoxy or trichloro organosilane.

In order to improve the dispersion of the particles in the liquid medium, the particle surface can be functionalized e.g. such that it has a high electrical surface charge or that it has a sufficiently high electrical polarity. In polar liquid media, the dispersion can be improved by the functionalization of the particle surface with polar groups, for example with hydroxy, methoxy or ethoxy groups. In nonpolar liquid media, the dispersion can be improved by the functionalization of the particle surface with nonpolar groups, for example with alkyl, phenyl or benzyl groups. Depending on the kind of liquid medium, however, a sufficient dispersion of the particles can also be achieved without functionalization, if already the particle surface, which is produced upon the manufacturing of the particles, makes possible a sufficient dispersion.

By the functionalization of the particle surface with positive or negative charges, the electrostatic repulsion forces between the particles can be adjusted or changed in a targeted fashion. The targeted adjustment of the electrostatic repulsion forces can be used to influence the formation of the light-diffractive regular structure. By changing the surface charges of the particles, the light-diffractive effect of the light-diffractive regular structure can be adjusted. For example, through changing the surface charges, the spacing of the lattice planes can be adjusted and thus the color of the security feature which is observable from a certain viewing angle. In order to modify the steric repulsion forces between the particles, the particles can also be functionalized with sterically very demanding groups, e.g. with polymer chains, and in particular with polyethylene glycol. Also through the modification of the steric repulsion forces, the spacing of the lattice planes and thus the color of the security feature can be influenced.

As a liquid medium for receiving the magnetic particles and for the encapsulation in microcapsules there can be used, for example:

aqueous solutions: pure water, saline solutions or mixtures of water and one or several alcohols;
  polar solvents: alkanols, e.g. ethanol, isopropanol; glycerin, glycol;
  nonpolar solvents: organic solvents, such as benzene, toluene, acetonitrile, hexane, chloroform, ether.

The liquid medium can also be formed viscously, e.g. as a viscous fluid or as a gel, e.g. as a hydrogel or polymer. The liquid medium, however, can also have lacquer, wax, oil or paraffin.

Compared to aqueous liquid media, in other polar liquid media the electrostatic repulsion forces of the magnetic particles are usually lower. For use in polar organic solvents, it is therefore advantageous to coat the magnetic particles such that a solvation shell is formed around the coating, which effects a steric repulsion of the magnetic particles or increases the steric repulsion force. For example, for this purpose the magnetic particles can be coated with silica. A silica coating of the magnetic particles leads for example in alkanols to the formation of a thick solvation shell which effects a mutual repulsion force of the magnetic particles. With nonpolar liquid media, the electrostatic repulsion forces of the particles are usually even smaller. Therefore, to nonpolar liquid media there are preferably added additives which facilitate the formation of surface charges.

In order to improve the properties of the security feature with regard to the application for securing documents of value, for example the following measures can be taken:

Incorporating additives into the liquid medium, which increase the durability of the security feature: For this purpose, into the liquid medium there can be incorporated colloidal stabilizers, e.g. tensides, which counteract an agglomeration of the magnetic particles. Alternatively or additionally, for improving the durability of the security feature there can be incorporated UV absorbers, radical scavengers or redox stabilizers into the liquid medium.
  Incorporating additives into the liquid medium, which influence the electrostatic repulsion of the magnetic particles and thus the light-diffractive properties of the light-diffractive regular structure. Such additives are e.g. substances which influence the ionic concentration in the liquid medium, e.g. salts, or substances which influence the pH-value of the liquid medium.
  Adjusting the refractive index of the liquid medium, in order to influence the refractive index jump relative to the magnetic particles and/or in order to influence the refractive index jump relative to that component of the document of value into which the microcapsules are incorporated: Preferably, the refractive index jump between the liquid medium and the magnetic particles is chosen as large as possible, in order to achieve a high intensity of the diffracted light. The refractive index jump between the liquid medium and the document of value, however, is preferably chosen as small as possible, so that as little incident light as possible is scattered at the microcapsules. Further, the liquid medium can be chosen such that as little light as possible is absorbed by the liquid medium.
  Incorporating colorants into the liquid medium and/or into the magnetic particles, in order to adjust the visual appearance of the security feature, e.g. its basic color.
  Incorporating additives into the liquid medium, in order to adjust the viscosity of the liquid medium. For example by increasing the viscosity, the magnetic field strength can be increased which is at least required for forming the light-diffractive regular structure within a certain time span.

In the following the invention is described by way of example with reference to the following Figures.

Figure 5A:
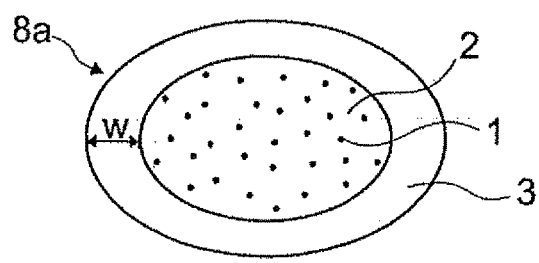
Figure 5B:
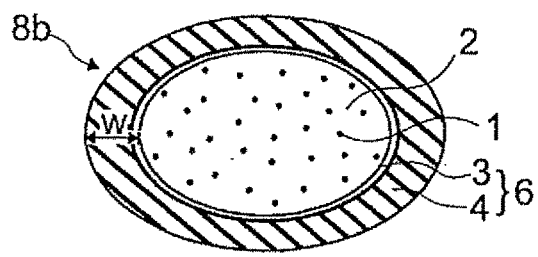
Figure 5C:
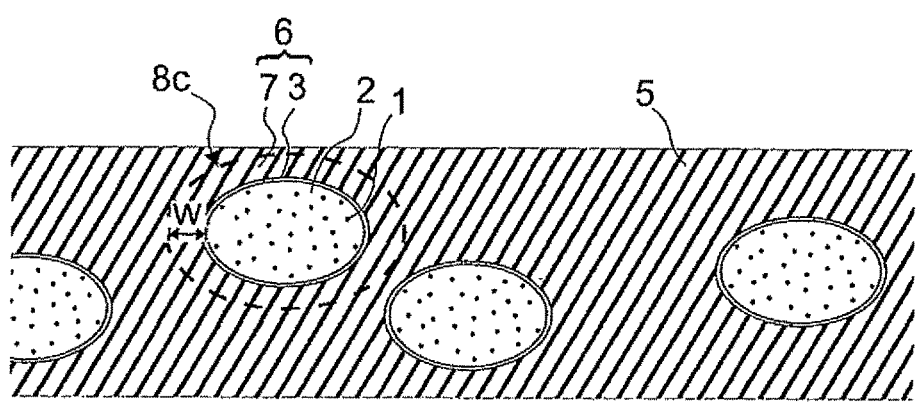

FIGS. 1a-b show schematic diagrams regarding the distribution of the magnetic particles in a liquid medium without applied magnetic field (FIG. 1a) and upon applied magnetic field (FIG. 1b), FIGS. 2a-b show two examples of the magnetic particles contained in the microcapsule, FIGS. 3a-b show schematic diagrams of the regular structures which the magnetic particles of FIG. 2a or 2b form upon applied magnetic field, FIG. 4 shows a microcapsule, which contains magnetic particles dispersed in liquid medium, with stabilizing wall, FIGS. 5a-c show three embodiments of the microcapsule of FIG. 4 with regard to the forming of the stabilizing wall.

In FIG. 1a there is shown a liquid medium 2 in which are suspended a plurality of magnetic particles 1, for example superparamagnetic particles 1. FIG. 1a shows the distribution of the superparamagnetic particles 1 in the liquid medium 2, when no or only a very weak magnetic field acts on the particles 1. In this case the superparamagnetic particles are arranged randomly. Under the influence of a magnetic field H, the magnetic interaction between the particles leads to the superparamagnetic particles 1 arranging themselves in a regular structure 9. This is schematically shown in FIG. 1b. At least in certain areas the superparamagnetic particles 1 form a photonic crystal.

The superparamagnetic particles 1 arrange themselves in this example such that lattice planes oriented perpendicular to the magnetic field H are formed, which are spaced apart by a lattice plane spacing d. This arrangement of the superparamagnetic particles 1 forms a light-diffractive regular structure 9, which reflects at certain angles certain wavelengths of an incident light 10. The connection between reflected light wavelength $\lambda$, lattice plane spacing d, refractive index of the liquid medium n and the light's angle of incidence $\theta$ is described by the Bragg equation $\lambda = 2nd \sin \theta$. Upon applied magnetic field H, thus, certain colors can be observed from certain angles. The lattice plane spacing d can be varied within a certain range by changing the magnetic field. In dependence on the applied magnetic field H, thus, the wavelength reflected by the lattice planes can be varied in a targeted fashion and with that the security feature's color observable from a certain angle.

The lattice plane spacing d is between 50 nm and 1000 nm. In dependence on the refractive index of the liquid medium used and in dependence on the magnetic field applied, the security feature reflects at certain angles of incidence and certain viewing angles certain wavelengths in the visible, in the infrared or in the ultraviolet spectral range.

In the FIGS. 2a and 3a there is shown an embodiment, in which the superparamagnetic particles 1a of the security feature are formed by agglomerates of a plurality of superparamagnetic iron oxide nanoparticles 13. These agglomerates have e.g. a diameter in the order of magnitude of 100 nm and consist of iron oxide nanoparticles with a size of 1-10 nm. The agglomerates in this example are respectively coated with a coating material 12, e.g. with silica, which is functionalized with the aid of organosilane. Through cooperation of the magnetic, electrostatic and steric forces the magnetic particles 1a arrange themselves in a liquid medium under the action of a magnetic field H to a light-diffractive hexagonal structure, cf. FIG. 3a. In this example, there are formed chains of superparamagnetic particles 1a, which are oriented along the magnetic field H. The lattice plane spacing d here is approximately 100-500 nm. By changing the magnetic field strength, a change of the diffraction conditions can be realized. The spacing between the chains, however, is not significantly changed with the magnetic field strength. The color impression of the reflected light upon different lattice plane spacings d is determined by the above-mentioned Bragg equation. Accordingly, from a viewing angle in parallel to the magnetic field vector ($\theta=90°$) and assuming an average refractive index of 1.33, there results a color impression of $\lambda = 2.66 \cdot d$, that is e.g. reflected light with a wavelength of approximately 532 nm at a lattice plane spacing d=200 nm.

In the FIGS. 2b and 3b there is shown a further embodiment in which the superparamagnetic particles 1b consist of polymer particles 14 in which are embedded several superparamagnetic nanoparticles 11. The polymer particles 1b can be formed e.g. as polystyrene particles. The superparamagnetic nanoparticles 14 consist of e.g. iron oxide and have a size of 2-10 nm. Upon the action of a magnetic field, the superparamagnetic particles 1b in a liquid medium form a light-diffractive regular structure, in this example a cubic face-centered space lattice, cf. FIG. 3b. The magnetic field direction here points in the direction of the space diagonal of the cubic face-centered unit cell. By changing the magnetic field strength, the magnetic forces between the superparamagnetic particles 1b can be changed, so that the lattice plane spacing d and thus the color impression of the security feature manufactured from these particles 1b can be adjusted in a targeted fashion. Under certain conditions, e.g. the use of deionized water as a liquid medium and a sufficient monodispersity of the particles 1b, the superparamagnetic particles 1b arrange themselves already without magnetic field by self-organization to a light-diffractive regular structure. Upon the action of a magnetic field, the light-diffractive regular structure of the superparamagnetic polymer particles can also form in saline solutions and polar organic solvents. The light-diffractive effect in this example is achieved by the Bragg diffraction at the (111)-surfaces of the cubic face-centered crystal. The lattice plane spacing here lies e.g. in the range of 100-200 nm. By changing the magnetic field conditions, the lattice plane spacing of neighboring (111)-surfaces can be changed in a targeted fashion in order to change the light-diffractive effect, e.g. so that from a certain viewing angle a certain color can be observed.

For the application as a security feature, the magnetic particles 1 dispersed in a liquid medium are encapsulated in microcapsules 8. As materials for the shell 3 of the microcapsules 8 there are suitable synthetic or natural polymers, e.g. polyurethane, polyurea, melamine resins, proteins, gelatin or polylactates.

FIG. 4 shows a microcapsule 8 according to the invention, in which a liquid medium 2 with magnetic particles 1 dispersed therein is encapsulated. The diameter of the microcapsule 8 is for example 10 µm. The microcapsule 8 has a wall 6, whose wall thickness w of at least 2 µm is especially large. The relation of wall thickness w to the maximum diameter of the microcapsule in this example is 20%. In order to provide the microcapsules with a wall having a large wall thickness w, various measures can be taken:

In FIG. 5a, there is shown an embodiment of a microcapsule 8a, whose original shell 3, which is produced upon the microencapsulation of the liquid medium 2 with the magnetic particles 1 dispersed therein, has already the large wall thickness w. Especially suitable here are methods for capsule formation, in which the growth of the shell 3 can be controlled well, in particular polymerization reactions in which growing polymer chains are responsible for building up the shell 3. The reaction conditions here are chosen such that a growth of the polymer layer to a thickness as large as possible is achieved. Upon continuous coating reactions, during which the growing layer is built up by the gradual dosed addition of components, a sufficient wall thickness can be achieved with the aid of a correspondingly prolonged dosing.

FIG. 5b shows a further embodiment of a microcapsule 8b, in which the original shell 3 produced upon the microencapsulation has a small thickness. Onto the original shell 3 in this embodiment there is applied a protection layer 4 in such a way that it completely surrounds the original shell 3. The wall 6 of the microcapsule 8b therefore consists of the original shell 3 and the protection layer 4. The protection layer 4 of the microcapsule 8b can be formed for example as a silica protection layer or as a polymer protection layer, or as a hybrid protection layer which has both silica and polymer as well as, optionally, further elements.

A silica protection layer 4 can be manufactured e.g. by acidifying water-glass or by hydrolysis of tetraethyl orthosilicate with ammonia. By using silica as a component of the protection layer 4, there can be achieved a high hardness of the microcapsule wall 4. Compared to the usual materials used for the microcapsule shell 3, there thus results, at the same thickness, an increased stability of the microcapsule 8b.

A polymer protection layer 4 can be manufactured e.g. by a polymerization, in which surface groups of the original microcapsule shell 3 produced upon the manufacturing of the microcapsule 8b are used as starter or anchor groups. Thereby, at the original microcapsule shell 3 there will grow further polymer chains, which—upon appropriate thickness—form a protection layer 4. By using polymer as a component of the protection layer 4, there can be achieved a high elasticity of the wall of the microcapsule 8b.

Preferably, onto the original shell 3 there is applied a protection layer 4 formed as a hybrid layer which contains both silica and polymer. By a hybrid protection layer 4 having silica and polymer there can be manufactured microcapsules 8b whose wall 6 is elastically deformable and at the same time has an increased stability. For manufacturing the hybrid protection layer 4, there is applied e.g. silica onto the original shell 3 and then there is carried out a functionalization of the silica surface in order to form anchor groups on the silica surface. The functionalization can be effected e.g. with the aid of a silane compound, e.g. with the aid of 3-(methacryloxy)propyltrimethoxysilane. The forming of the polymer can be achieved by a radical polymerization, upon which polymer grows on the silica-coated microcapsules 8b.

In FIG. 5c there is displayed a further embodiment with several microcapsules 8c. The microcapsules 8c are embedded in a solid-state layer 5. For manufacturing the structure shown in FIG. 5c, first a liquid medium 2 with magnetic particles 1 dispersed therein is encapsulated according to a standard method for microencapsulation, e.g. by means of coacervation. In doing so, usually, microcapsules are manufactured, which have an original shell 3 with a relatively small thickness. These microcapsules are embedded into a solid-state layer 5 such that the microcapsules by the embedding respectively obtain a wall 6 with large wall thickness. The wall 6 of the respectively resulting microcapsule 8c is composed of the original shell 3 and of the section 7 of the solid-state layer 5, which directly surrounds the shell 3 of the respective microcapsule. The solid-state layer 5 here provides a common protection layer 5 for a plurality of microcapsules 8c. As a solid-state layer 5 there is suitable e.g. a polymer layer. The (original) microcapsules here are incorporated into the (liquid) polymer before the polymerization and then fixed in the polymer layer by polymerization.

The invention claimed is:

1. A security feature comprising a plurality of microcapsules contained in a first medium,
   wherein each of the microcapsules includes a wall encapsulating a second medium, the second medium being a liquid medium,
   wherein, within the liquid medium of each of the microcapsules, several magnetic particles are distributed, the magnetic particles being movable in the liquid medium, and
   wherein the magnetic particles are configured to arrange themselves within the microcapsule when affected by a magnetic field to form a light-diffractive regular structure.

2. The security feature according to claim 1, wherein each of the microcapsules is stabilized by its respective wall such that they are useable as a component of the security feature for securing a document of value.

3. The security feature according to claim 1, wherein the wall of each of the microcapsules is individually applied and each of the microcapsules is stabilized by its respective wall such that each of the microcapsules can be applied by a printing process onto a document of value.

4. The security feature according to claim 1, wherein the wall of each of the microcapsules has a wall thickness (w) of at least 10% of the largest diameter of the microcapsule.

5. The security feature according to claim 1, wherein the wall of each of the microcapsules has a wall thickness (w) which is at least 2 μm.

6. The security feature according to claim 1, wherein each of the microcapsules has a diameter of no more than 20 μm.

7. The security feature according to claim 1, wherein the magnetic particles are configured as superparamagnetic particles or the magnetic particles are configured as ferro or ferrimagnetic particles, the remnant magnetization of which is no more than 20% of their saturation magnetization.

8. The security feature according to claim 1, wherein the wall of each of the microcapsules includes a shell produced upon the manufacturing of the microcapsule.

9. The security feature according to claim 1, wherein the wall of each of the microcapsules includes a shell of the microcapsule, and a protection layer completely surrounding the shell.

10. The security feature according to claim 9, wherein the protection layer of each of the microcapsules includes an individual protection layer which is individually applied onto the microcapsule.

11. The security feature according to claim 9, wherein the protection layer of the microcapsule is provided through a solid-state layer, in which several microcapsules are embedded and which respectively together with the shell of the microcapsule forms the wall of the microcapsule.

12. A security element comprising the security feature recited in claim 1.

13. The security feature according to claim 1, wherein the first medium is a solid-state layer that is a component of a document of value.

14. The security feature according to claim 1, wherein the first medium is a liquid configured to be applied to a document of value to be secured.

15. A document of value or security paper comprising the security feature in claim 1.

16. A document of value or security paper comprising the security element recited of claim 12.

17. A method for manufacturing a security feature, the method comprising:
   providing a plurality of microcapsules within a first medium,
   wherein each of the microcapsules includes a wall encapsulating a second medium, the second medium being a liquid medium,
   wherein, within the liquid medium of each of the microcapsules, several magnetic particles are distributed, the magnetic particles being movable in the liquid medium, and
   wherein the magnetic particles are configured to arrange themselves within the microcapsule when affected by a magnetic field to form a light-diffractive regular structure.

18. The method according to claim 17, wherein each of the microcapsules are stabilized by its respective wall such that it is configured to used to secure a document of value.

* * * * *